US011559739B2

(12) United States Patent
Motokura et al.

(10) Patent No.: US 11,559,739 B2
(45) Date of Patent: Jan. 24, 2023

(54) STORAGE MEDIUM HAVING STORED THEREIN GAME PROGRAM, GAME APPARATUS, GAME SYSTEM, AND GAME PROCESSING METHOD

(71) Applicant: NINTENDO CO., LTD., Kyoto (JP)

(72) Inventors: Kenta Motokura, Kyoto (JP); Shinya Hiratake, Kyoto (JP); Katsuyasu Ando, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/383,842

(22) Filed: Jul. 23, 2021

(65) Prior Publication Data

US 2022/0062762 A1 Mar. 3, 2022

(30) Foreign Application Priority Data

Aug. 26, 2020 (JP) .............................. JP2020-142324

(51) Int. Cl.
*A63F 13/52* (2014.01)
(52) U.S. Cl.
CPC .................................... *A63F 13/52* (2014.09)
(58) Field of Classification Search
CPC ......... A63F 13/52; A63F 13/822; A63F 13/44
See application file for complete search history.

(56) References Cited

U.S. PATENT DOCUMENTS

| | | |
|---|---|---|
| 2002/0142848 A1 | 10/2002 | Tsuchida et al. |
| 2004/0163133 A1 | 8/2004 | Ueda et al. |
| 2017/0239570 A1 | 8/2017 | Iguchi |

FOREIGN PATENT DOCUMENTS

| | | |
|---|---|---|
| JP | 2000-61139 | 2/2000 |
| JP | 2002-292135 | 10/2002 |
| JP | 2004-242706 | 9/2004 |
| JP | 2013-118887 | 6/2013 |
| JP | 2017-144158 | 8/2017 |
| JP | 2018-187104 | 11/2018 |

OTHER PUBLICATIONS

Clash of Clans Wiki, "Clan Wars FAQ," May 2, 2020, https://web.archive.org/web/20200502161820/https://clashofclans.fandom.com/wiki/Clan_Wars_FAQ (Year: 2020).*
TV Tropes, "Opening The Sandbox," Oct. 23, 2009, https://web.archive.org/web/20091023054756/https://tvtropes.org/pmwiki/pmwiki.php/Main/OpeningTheSandbox (Year: 2009).*
TV Tropes, "Asteroids Monster," Nov. 9, 2019, https://web.archive.org/web/20191109220326/https://tvtropes.org/pmwiki/pmwiki.php/Main/AsteroidsMonster (Year: 2019).*
"Yoshi's Crafted World", [online] , Nintendo of America Inc., [searched on Jul. 31, 2020], internet (URL:https://yoshiscraftedworld.nintendo.com/), printed Jul. 23, 2021, 14 pages.

* cited by examiner

*Primary Examiner* — Kevin Y Kim
(74) *Attorney, Agent, or Firm* — Nixon & Vanderhye P.C.

(57) ABSTRACT

In a second mode where a first enemy object attacks a player object in a virtual space, no matter which of a switching condition that a second time elapses and a switching condition that the player object gains a second required number of target objects smaller than a first required number before the second time elapses is satisfied, a game mode is switched to a first mode where the first enemy object does not attack the player object.

15 Claims, 15 Drawing Sheets

F I G. 1 1
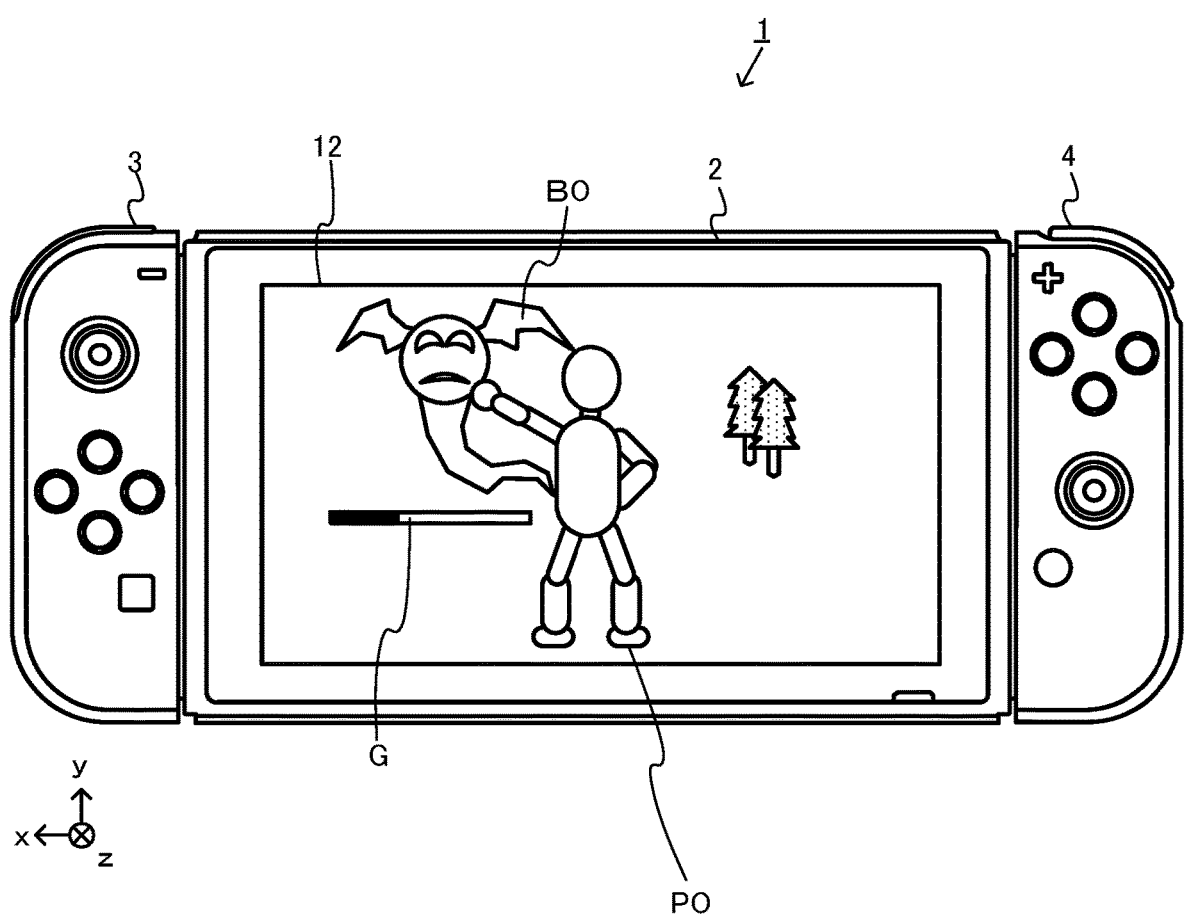

STORAGE MEDIUM HAVING STORED THEREIN GAME PROGRAM, GAME APPARATUS, GAME SYSTEM, AND GAME PROCESSING METHOD

CROSS REFERENCE TO RELATED APPLICATION

This application claims priority to Japanese Patent Application No. 2020-142324 filed on Aug. 26, 2020, the entire contents of which are incorporated herein by reference.

FIELD

The technology shown here relates to a storage medium having stored therein a game program, a game apparatus, a game system, and a game processing method that perform processing using an enemy object in a virtual space.

BACKGROUND AND SUMMARY

Conventionally, there is a game program that progresses such that a game stage is in a special state for a certain time in accordance with a representation that occurs at predetermined intervals.

In the above game program, however, there is a possibility that the behavior of a player object operated by a user is inactive until the certain time elapses and the game stage returns to a normal state.

Therefore, it is an object of an exemplary embodiment to provide a storage medium having stored therein a game program, a game apparatus, a game system, and a game processing method that are capable of bringing diversity to behaviors that a player object operated by a user can take on.

To achieve the above object, the exemplary embodiment can employ, for example, the following configurations.

In an exemplary configuration of a non-transitory computer-readable storage medium having stored therein a game program according to the exemplary embodiment, a non-transitory computer-readable storage medium has stored therein instructions that, when executed by a processor of an information processing apparatus, cause the information processing apparatus to perform operations including: in accordance with a lapse of a first time, switching a game mode from a first mode where a first enemy object does not attack a player object in a virtual space to a second mode where the first enemy object attacks the player object in the virtual space; based on a state where the player object gains a first required number of target objects in the first mode and/or the second mode, switching the game mode to a third mode where the player object can perform a first attack on the first enemy object; in the second mode, no matter which of a switching condition that a second time elapses and a switching condition that the player object gains a second required number of the target objects smaller than the first required number before the second time elapses is satisfied, switching the game mode to the first mode; and executing a game relating to the game mode.

Based on the above, a second mode where a player object is subjected to an attack of a first enemy object can be ended not only due to the lapse of time in the second mode but also by the player object gaining a target object during the second mode. Thus, it is possible to bring diversity to behaviors that the player object can take on during the second mode. Further, it is also possible to give a user a motivation to acquire a target object.

Further, if an accumulated amount of attack on the first enemy object exceeds a predetermined amount, the number of the target objects that can be gained by the player object in the virtual space may be increased.

Based on the above, by attacking a first enemy object, it is possible to further gain a target object.

Further, the number of the target objects that can be gained by the player object in the virtual space may be increased by expanding a range where the player object can move in the virtual space.

Based on the above, the range where the player object can move is expanded, whereby it is possible to perform a representation that a target object can be further gained.

Further, the instructions may further cause the information processing apparatus to perform operations including: if an accumulated amount of attack on the first enemy object exceeds a predetermined amount in the second mode and/or the third mode, switching the game mode to the first mode.

In this case, if the game mode is switched to the first mode by the accumulated amount exceeding the predetermined amount, the game mode may be switched from the first mode to the second mode in accordance with a lapse of a third time longer than the first time.

Based on the above, by attacking the first enemy object, it is possible to lengthen the time until a game mode is switched to the second mode where the player object is subjected to an attack of the first enemy object.

Further, the game mode may be switched from the first mode to the second mode without changing a position of the player object in the virtual space.

Based on the above, it is possible to switch a game mode without the player object moving to another dedicated stage or the like.

Further, if the game mode is switched from the second mode to the first mode by satisfying the switching condition that the player object gains the second required number of the target objects, an accumulated amount of attack on the first enemy object may be increased by performing a second attack on the first enemy object. If the game mode is switched from the second mode to the first mode by satisfying the switching condition that the second time elapses, the accumulated amount of attack may not be increased.

Based on the above, the second mode switches to a first mode by gaining a target object, whereby it is possible to give the user a motivation to damage the first enemy object.

Further, the accumulated amount of attack accumulated for the first enemy object by the second attack may be smaller than the accumulated amount of attack accumulated for the first enemy object by the first attack.

Based on the above, it is possible to urge the user to cause the player object to perform an attack in a third mode.

Further, in the first mode, the player object may not be enabled to attack the first enemy object.

Based on the above, to attack the first enemy object, it is necessary to switch to a third mode. Thus, it is possible to increase the worth of gaining a target object required to switch to the third mode.

Further, without changing control of a behavior of a second enemy object in both the first mode and the second mode, an action of the second enemy object attacking the player object may be controlled.

Based on the above, in both a first mode and the second mode, control of the behavior of a second enemy object does not change. Thus, it is possible to prevent the level of difficulty of a game from extremely changing by switching modes.

Further, an accumulated amount of attack on the first enemy object may not be changed by switching the game mode.

Based on the above, an attack on the first enemy object is handed over also to another mode. Thus, it is possible to prevent the previous attack from being ineffective due to the switching of modes.

Further, in the second mode and/or the third mode, an attack object that damages the player object if the player object comes into contact with the attack object may be added to a field in the virtual space, thereby causing the first enemy object to attack the player object.

Based on the above, it is possible to enrich variations of an attack of the first enemy object.

Further, the first time may be longer than the second time.

Based on the above, it is possible to shorten the time in which the first enemy object attacks the player object.

Further, the exemplary embodiment may be carried out in the forms of a game apparatus, a game system, and a game processing method.

According to the exemplary embodiment, it is possible to bring diversity to behaviors that a player object can take on.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is a diagram showing a non-limiting example of a game image in the state where a player object PO can attack the enemy boss object BO;

DETAILED DESCRIPTION OF NON-LIMITING EXAMPLE EMBODIMENTS

A game system according to an exemplary embodiment is described below. An example of the game system 1 according to the exemplary embodiment includes a main body apparatus (an information processing apparatus; which functions as a game apparatus main body in the exemplary embodiment) 2, and a left controller 3 and a right controller 4 and functions also as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
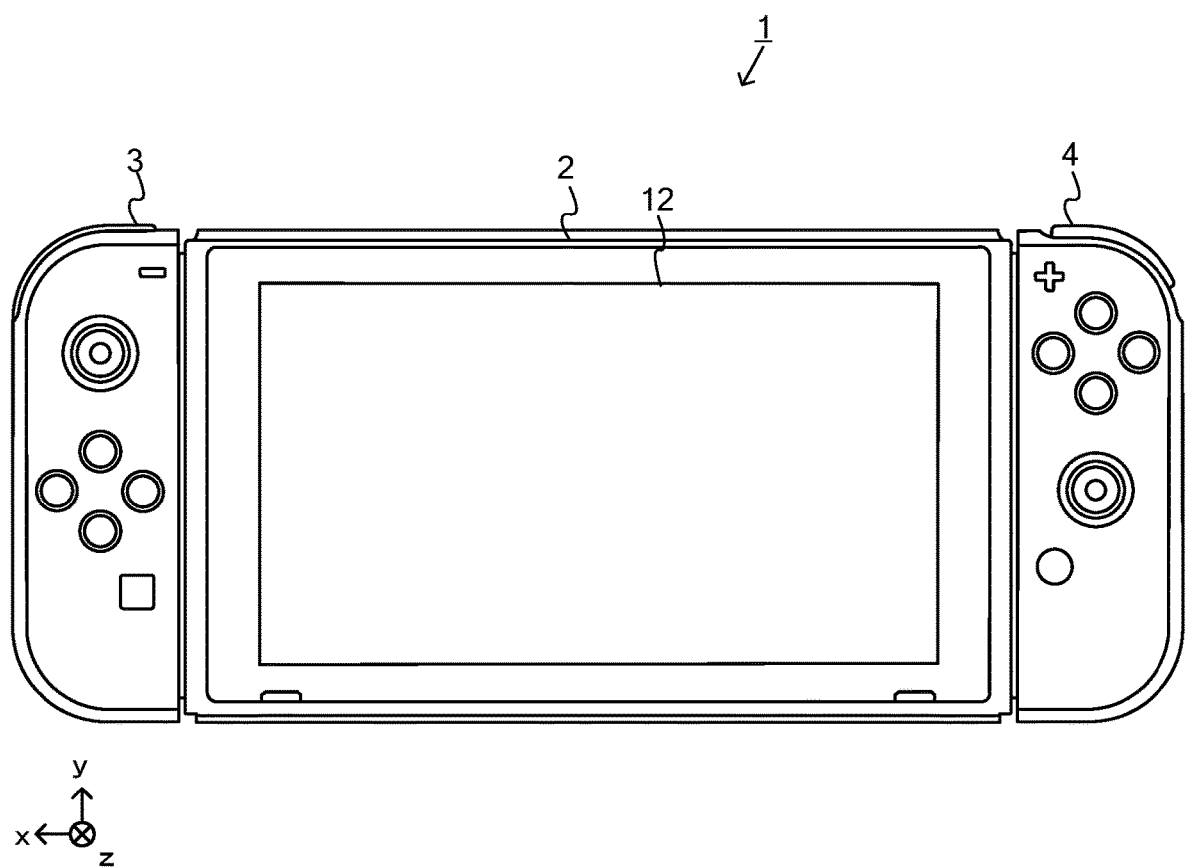
FIG. 1 is a diagram showing a non-limiting example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
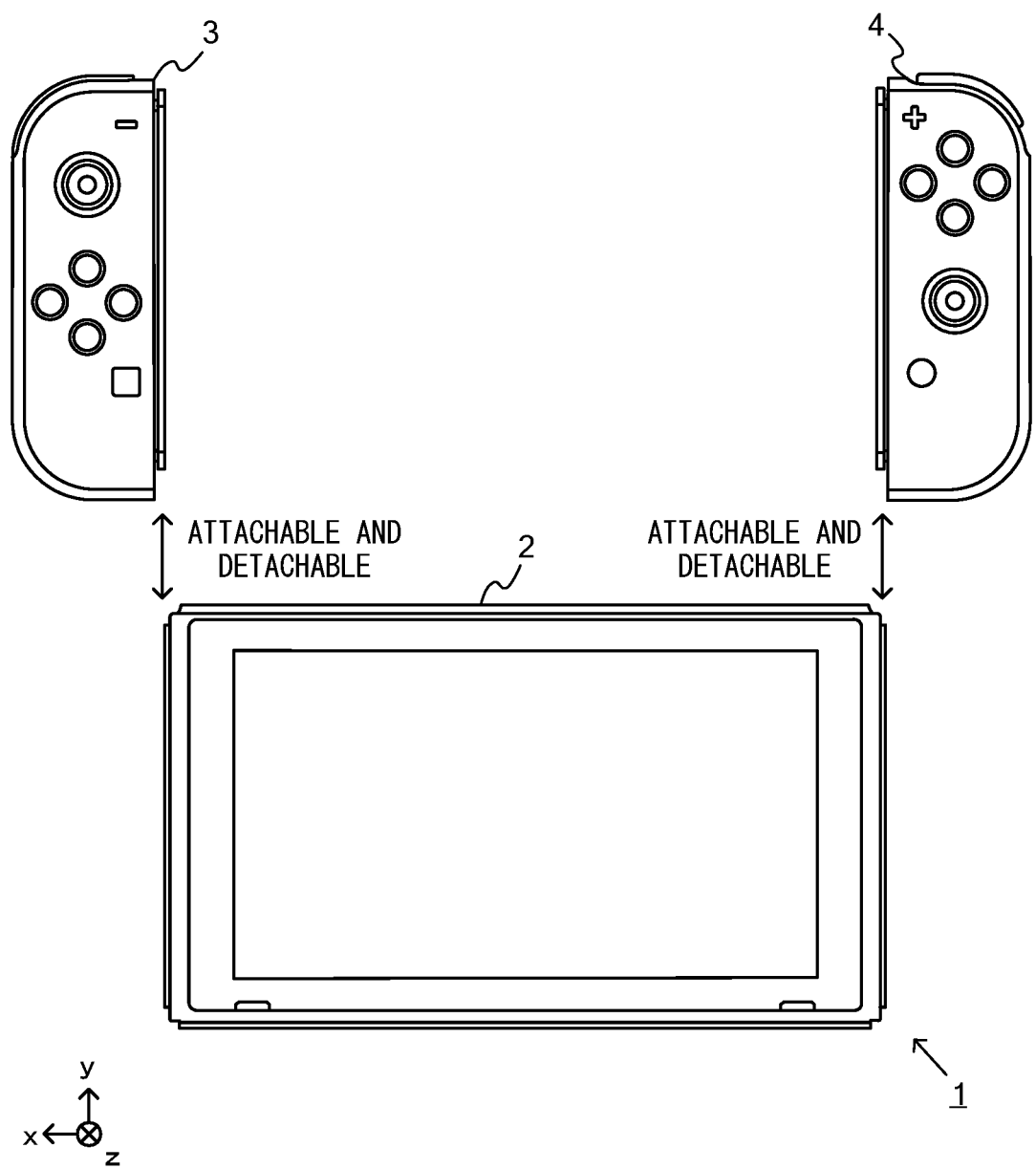
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
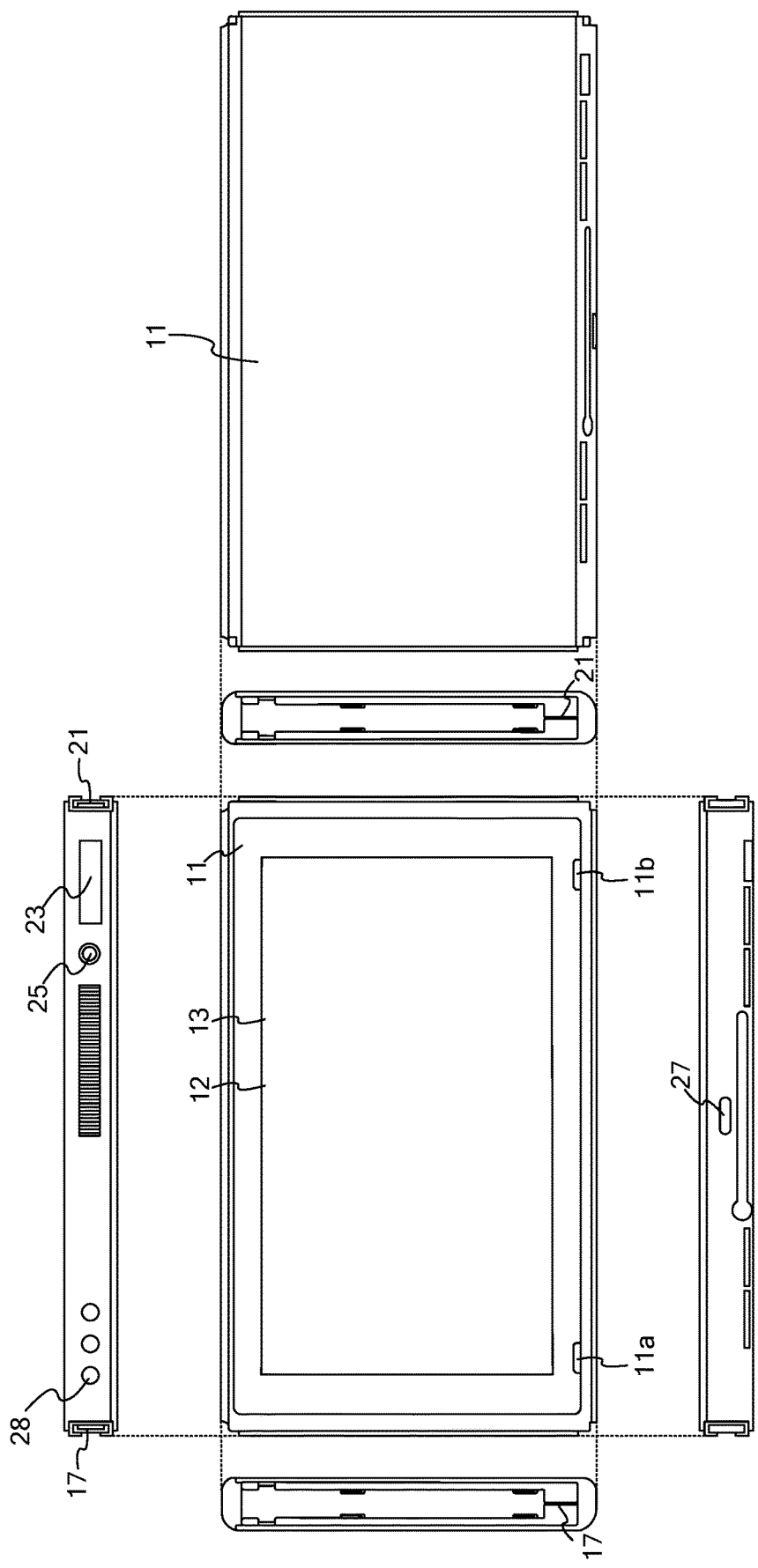
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
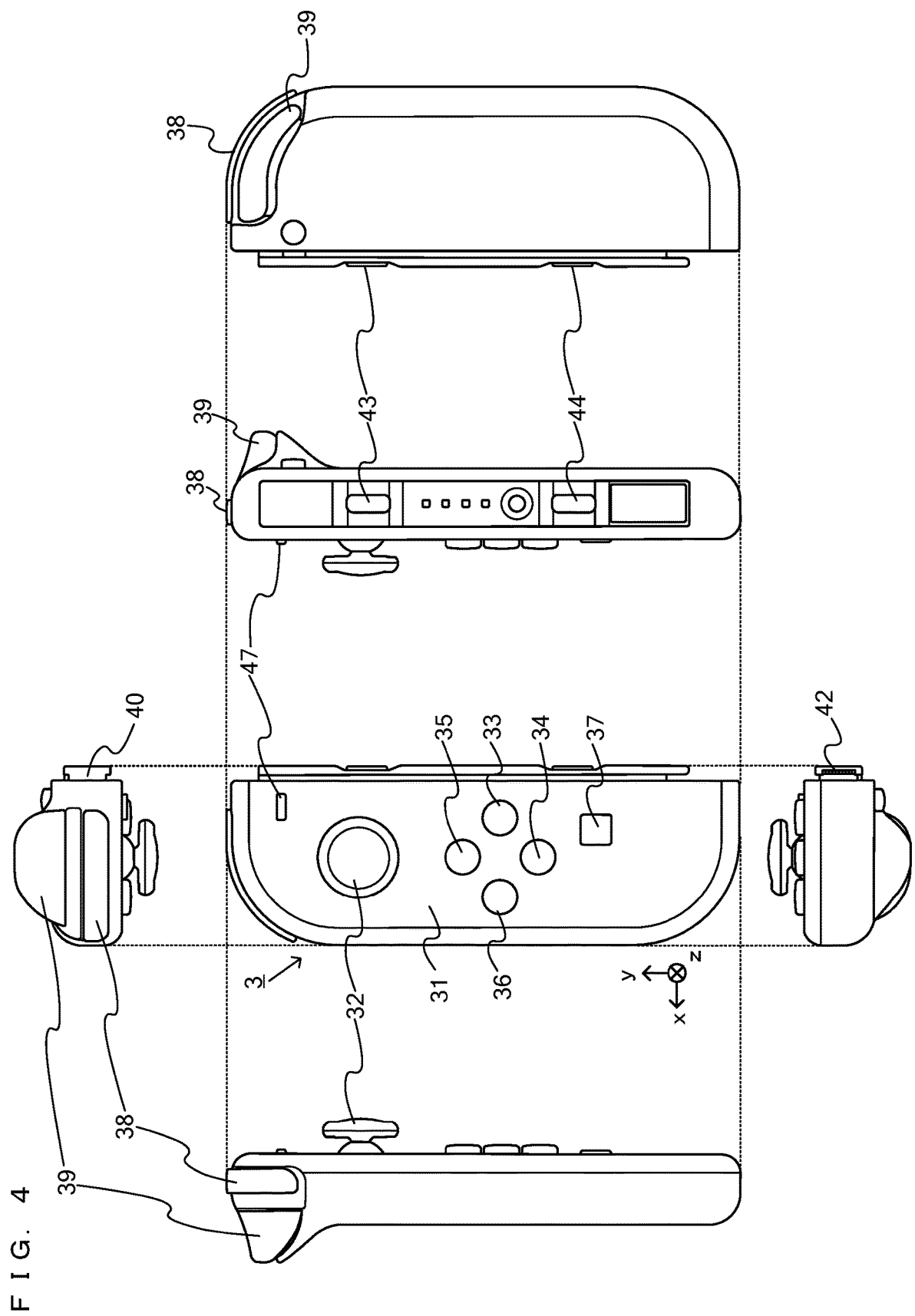
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
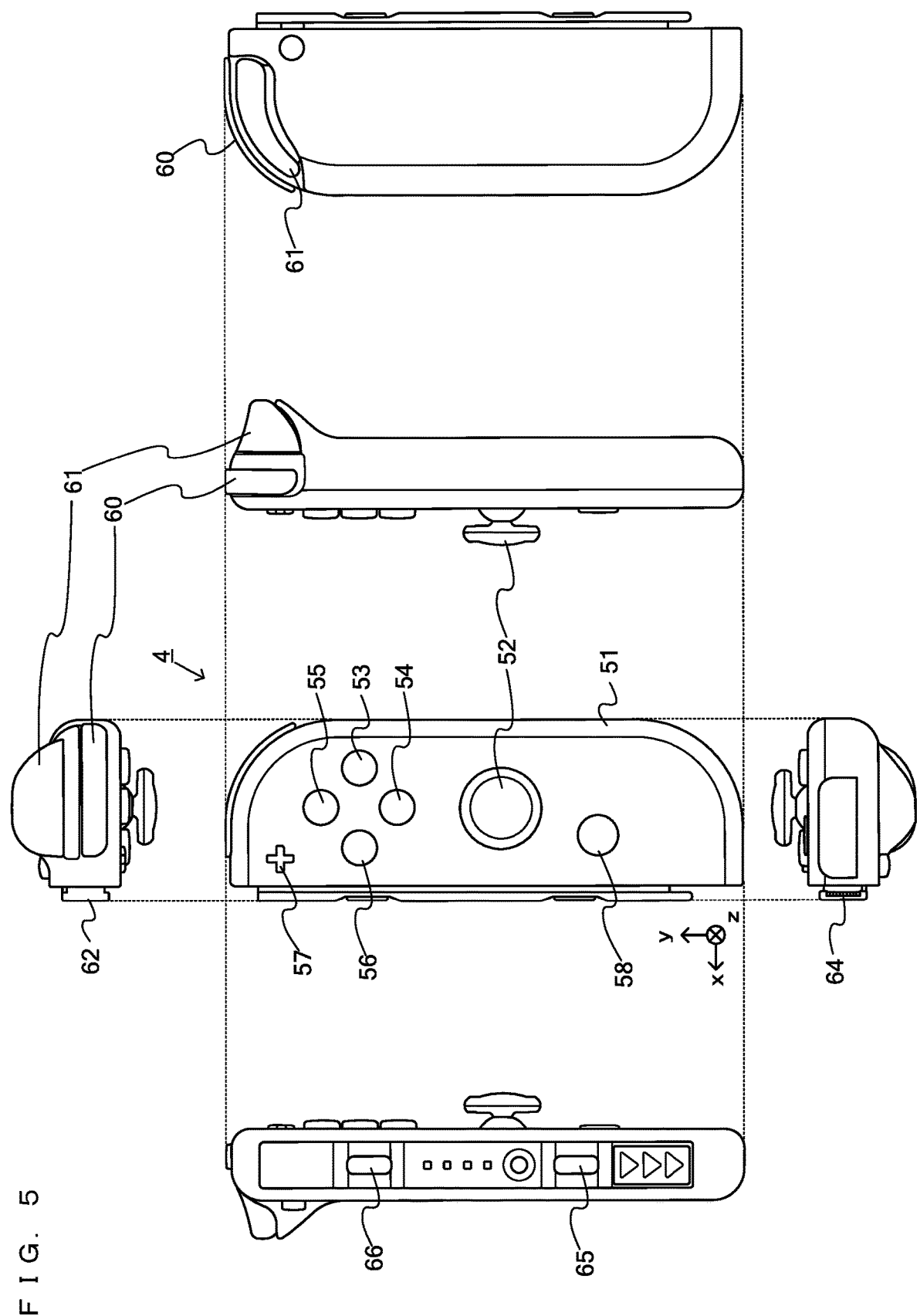
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
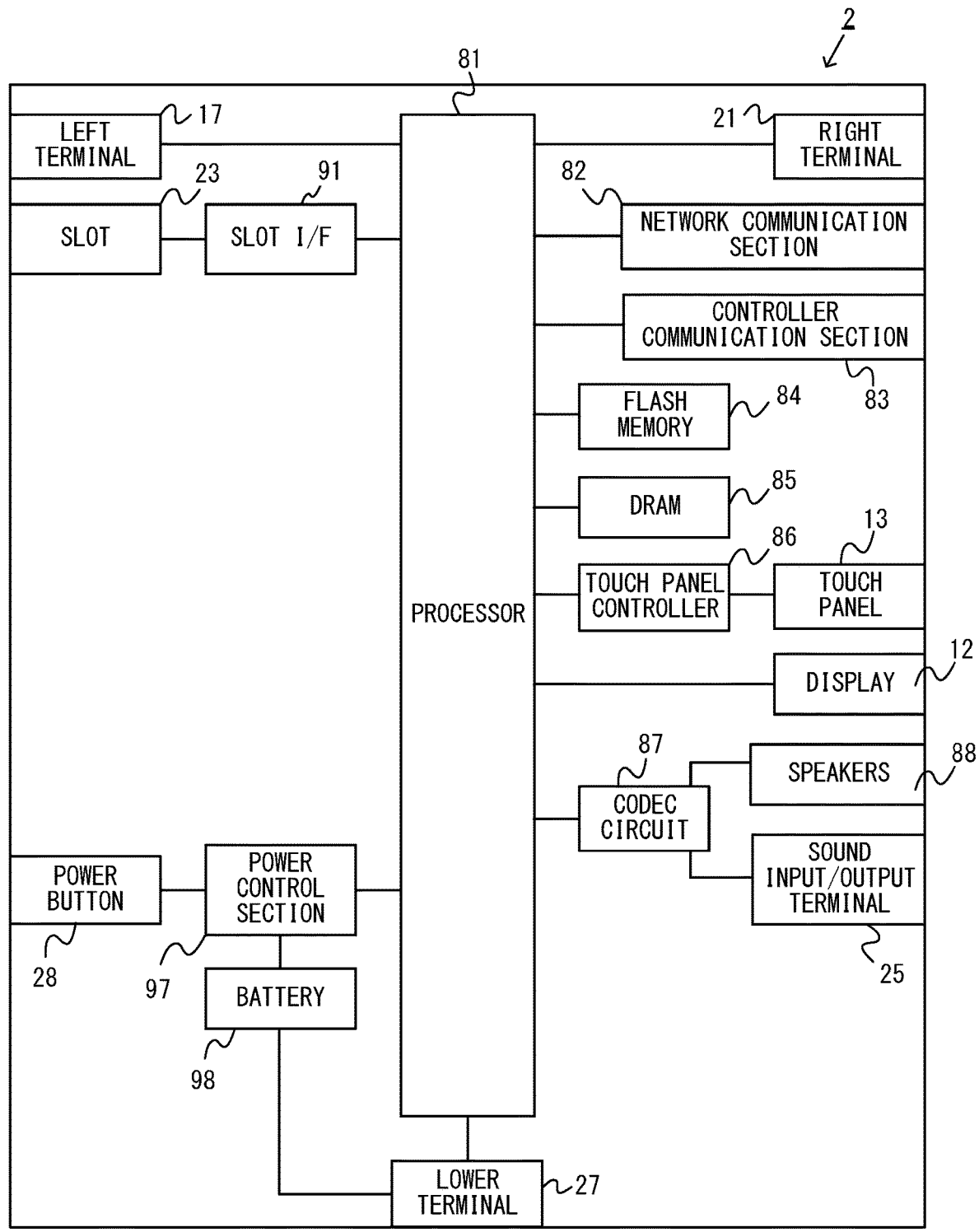
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
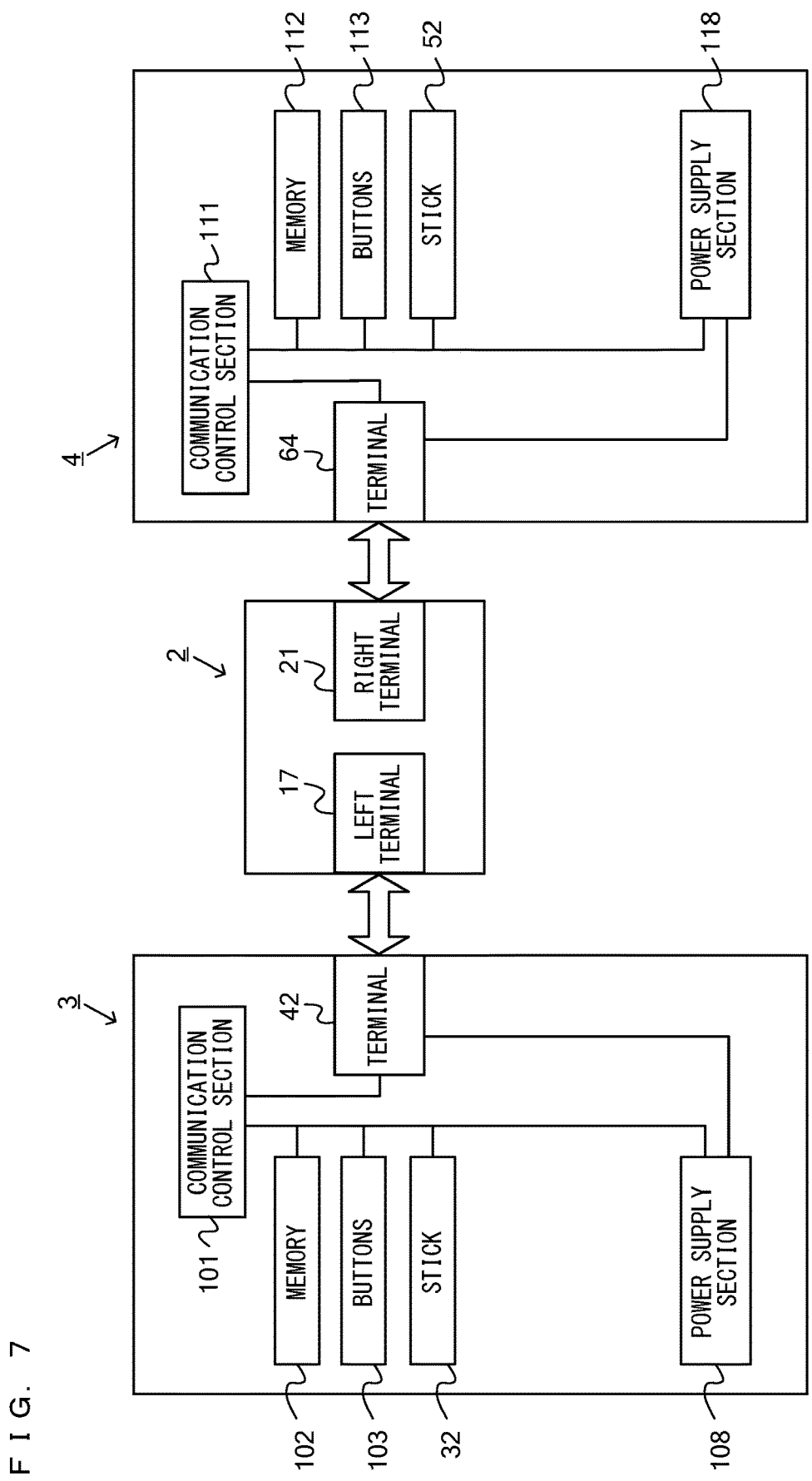
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to an external display device such as the stationary monitor. A description is given below using the game system 1 in the use form of the unified apparatus obtained by attaching the left controller 3 and the right controller 4 to the main body apparatus 2.

As described above, in accordance with operations on the operation buttons and the sticks of the left controller 3 and/or the right controller 4 in the game system 1 as the unified apparatus, a touch operation on the touch panel 13 of the main body apparatus 2, and the like, a game using a virtual space displayed on the display 12 is played. In the exemplary embodiment, as an example, in accordance with user operations using the above operation buttons, the sticks, and the touch panel 13, it is possible to play a game using a player object in a virtual space and objects such as an enemy object placed in the virtual space.

Figure 8:
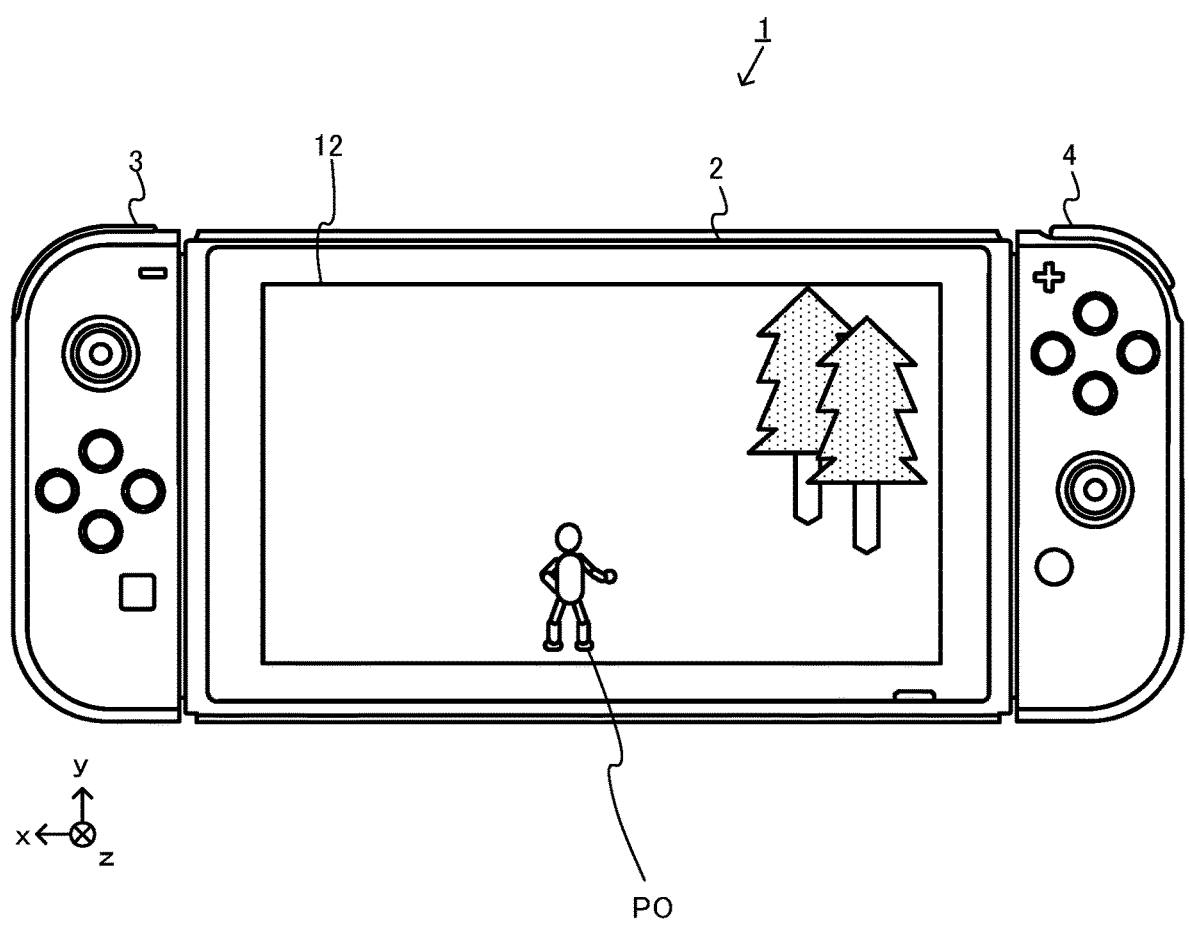
FIG. 8 is a diagram showing a non-limiting example of a game image in a normal mode displayed on a display 12 of the main body apparatus 2.
Figure 9:
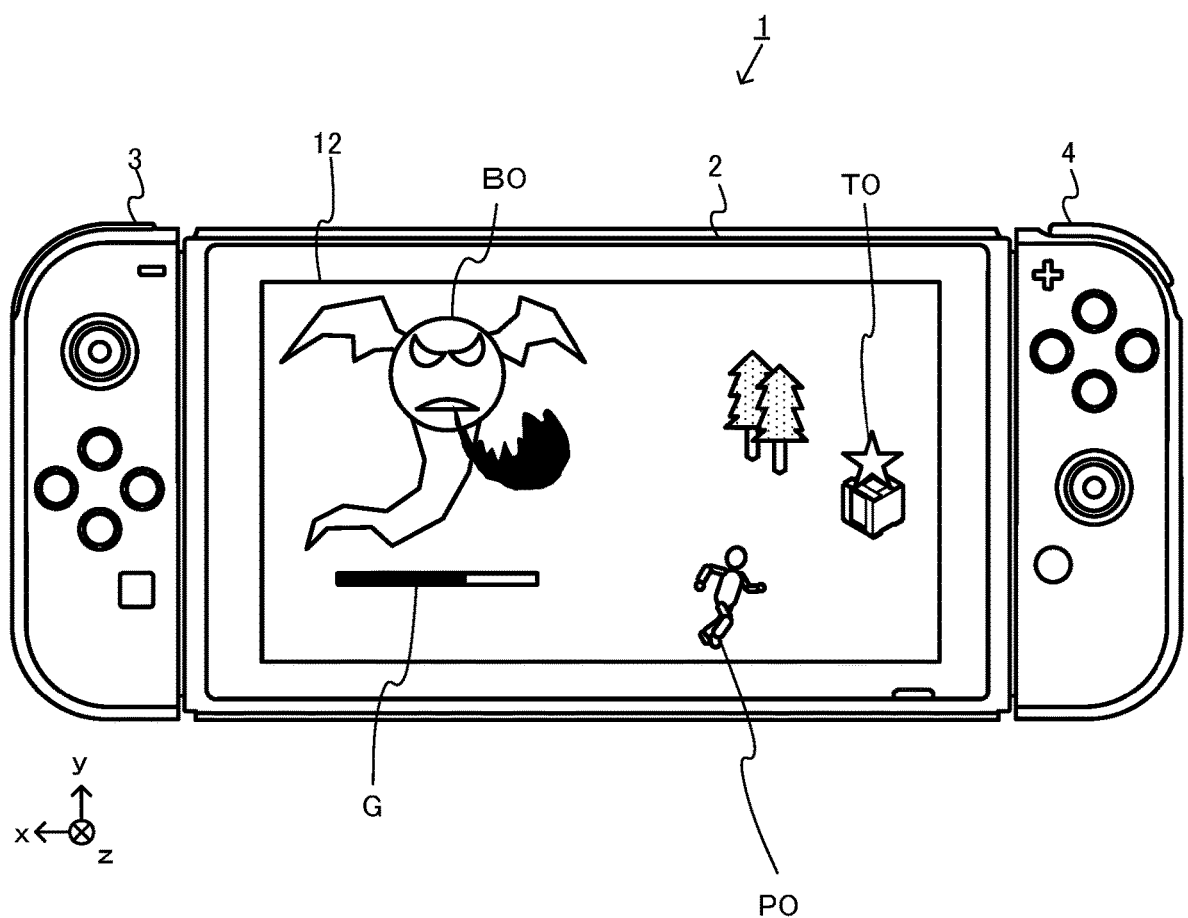
FIG. 9 is a diagram showing a non-limiting example of a game image in an enemy boss attack mode where an attack of an enemy boss object BO is performed.
Figure 10:
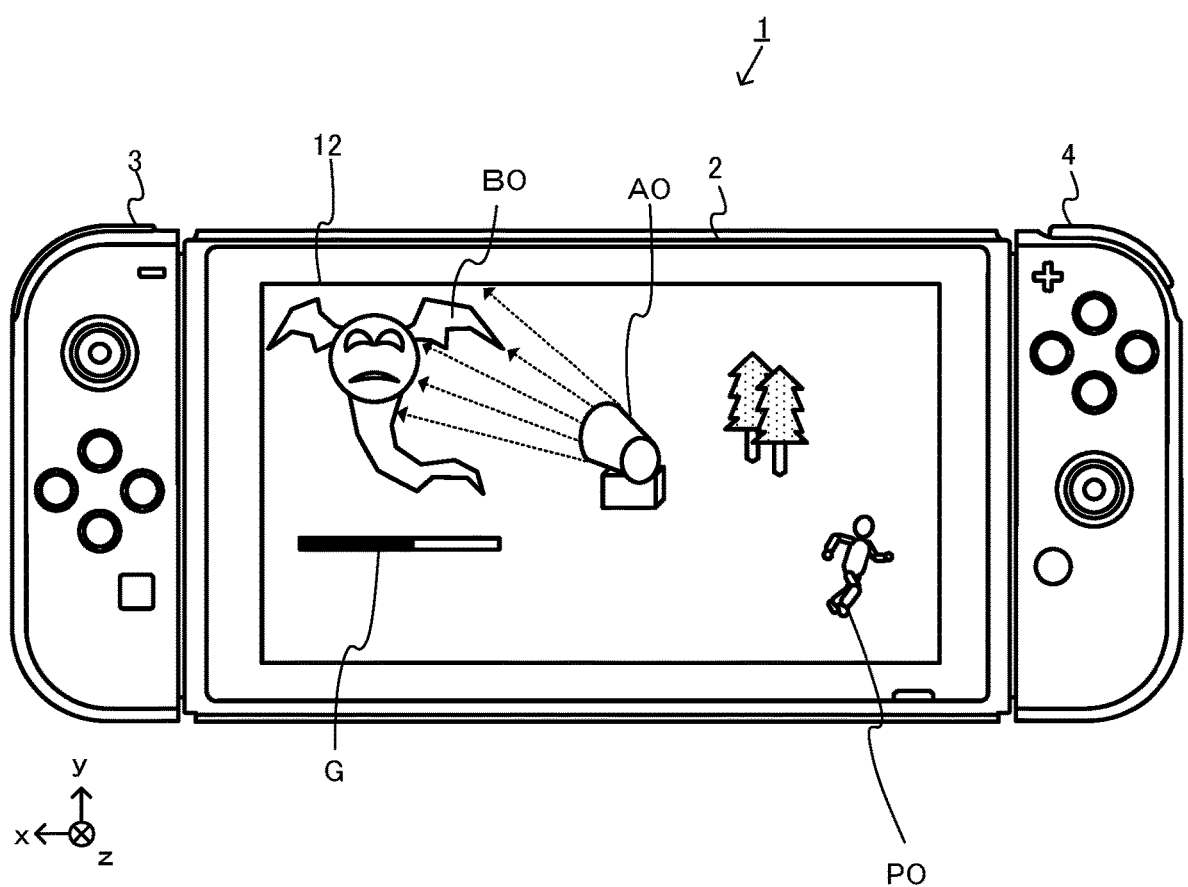
FIG. 10 is a diagram showing a non-limiting example of a game image when the enemy boss attack mode ends.

With reference to FIGS. 8 to 11, a description is given of an overview of game processing performed by the game system 1. FIG. 8 is a diagram showing an example of a game image in a normal mode displayed on the display 12 of the main body apparatus 2. FIG. 9 is a diagram showing an example of a game image in an enemy boss attack mode where an attack of an enemy boss object BO is performed. FIG. 10 is a diagram showing an example of a game image when the enemy boss attack mode ends. FIG. 11 is a diagram showing an example of a game image in the state where a player object PO can attack the enemy boss object BO.

In FIG. 8, on the display 12 of the game system 1, a game image is displayed in which a player object PO and other virtual objects are placed in a virtual space. For example, FIG. 8 shows a game image in a normal mode where the player object PO performs a search while moving in the virtual space in accordance with a user operation. As an example, the player object PO moves for the purpose of searching for and gaining a target object TO (e.g., a coin) as a gaining target in the virtual space. The player object PO can acquire an ability relating to the number of gained target objects TO or cause an event. In this exemplary game, the range where the player object PO can move in the virtual space is defined, and the number of target objects TO that can be gained is set in accordance with this range. Then, the player object PO clears a predetermined event (e.g., defeats an enemy boss object BO by crushing the enemy boss object BO), whereby the range where the enemy boss object BO can move is enlarged. This increases the number of target objects TO that can be gained. In the normal mode, if the player object PO becomes able to attack the enemy boss object BO, the player object PO can attack the enemy boss object BO in the virtual space, and the player object PO can obtain the ability to perform an attack in accordance with the number of gained target objects TO. Further, in an enemy boss attack mode described below, the player object PO gains a predetermined required number of target objects TO during the enemy boss attack mode and thereby can end the enemy boss attack mode. The above normal mode is equivalent to an example of a first mode.

If a first time elapses in the above normal mode, the normal mode switches to an enemy boss attack mode. Then, if a second time elapses in the enemy boss attack mode, the enemy boss attack mode returns to the normal mode. Here, the enemy boss attack mode is a game mode where an attack of the enemy boss object BO is performed. A game is played using the same game stage as that of the normal mode, and the position of the player object PO does not change by being triggered by the switching of modes. That is, even if the normal mode switches to the enemy boss attack mode, the player object PO does not move to another dedicated stage. As an example, every time the first time (e.g., six minutes) elapses in the above normal mode, the normal mode switches to the enemy boss attack mode. Then, after the normal mode switches to the enemy boss attack mode, the second time (e.g., a minute) elapses, whereby the enemy boss attack mode ends and restores to the normal mode. In the enemy boss attack mode, an attack object (e.g., a meteor object that falls from the sky) that damages the player object PO if the player object PO comes into contact with the attack object may be added to the field in the virtual space and move, whereby the enemy boss object BO may attack the player object PO. In this case, in the enemy boss attack mode, the player object PO is subjected to not only an attack of the enemy boss object BO but also an attack of the above attack object. Thus, in this game field, objects that attack player objects PO as targets appear by increasing as compared with the normal mode. The enemy boss object BO is equivalent to an example of a first enemy object. The above enemy boss attack mode is equivalent to an example of a second mode.

In the above description, an example has been used where the same game stage is used in the normal mode and the enemy boss attack mode, and even if the normal mode is switched to the enemy boss attack mode, the player object PO does not move to another dedicated stage. Alternatively, different game stages may be used in the respective modes. For example, if the normal mode is switched to the enemy boss attack mode, the player object PO may move to a dedicated stage used in the enemy boss attack mode, and the game may be advanced.

As shown in FIG. 9, in the enemy boss attack mode, the enemy boss object BO appears in the virtual space, and the player object PO is attacked by the enemy boss object BO. Then, the player object PO may be attacked by the enemy boss object BO, whereby the life value of the player object PO may be reduced by a predetermined amount. Then, the life value may reach 0, whereby the player object PO may lose to the enemy boss object BO, and the game may be over. On the other hand, a life value is also set for the enemy boss object BO, and a gauge G indicating the life value of the enemy boss object BO at the current moment is displayed. Then, the life value of the enemy boss object BO reaches 0, whereby the enemy boss object BO also loses to the player object PO and temporarily disappears from the virtual space. Also in the enemy boss attack mode, the player object PO cannot attack the enemy boss object BO until the player object PO enters an attack-possible state.

In both the normal mode and the enemy boss attack mode, an enemy object different from the enemy boss object BO may appear in the virtual space. A setting may be made so that the above enemy object also behaves with the player object PO as an attack target, but the player object PO cannot attack the enemy object until the player object PO enters the attack-possible state.

In the exemplary embodiment, there are a plurality of switching conditions for restoring from the enemy boss attack mode to the normal mode, and no matter which of the switching conditions is satisfied, the enemy boss attack mode is switched to the normal mode.

In a first switching condition, after the above enemy boss attack mode starts, the second time elapses, whereby the enemy boss attack mode ends, the enemy boss object BO temporarily leaves the virtual space, and the enemy boss attack mode restores to the normal mode again.

In a second switching condition, the player object PO gains a predetermined required number of target objects TO (see FIG. 9) (e.g., a single target object TO) before the above second time elapses during the above enemy boss attack mode, whereby the enemy boss attack mode ends, the enemy boss object BO temporarily leaves the virtual space, and the enemy boss attack mode restores to the normal mode again. Here, as shown in FIG. 10, in a case where the enemy boss attack mode ends according to the satisfaction of the second switching condition, and when the enemy boss attack mode ends, damage is caused to the enemy boss object BO that leaves the virtual space. For example, an installation object AO placed in the virtual space attacks the enemy boss object BO that leaves, whereby a predetermined amount of damage is caused to the enemy boss object BO. This attack of the installation object AO also reduces the life value of the enemy boss object BO by a predetermined amount, and therefore, the life value of the enemy boss object BO indicated by the gauge G also decreases by the predetermined amount. The magnitude of the life value of the enemy boss object BO reduced by an attack of the installation object AO may be relatively smaller than the magnitude of the life value of the enemy boss object BO reduced by an attack of the player object PO described below. Damage may not be caused to the enemy boss object BO by an attack of the installation object AO when the enemy boss attack mode ends according to the satisfaction of the second switching condition, or the installation object AO or the like may not attack the enemy boss object BO. The number of target objects TO that need to be gained to restore from the enemy boss attack mode to the normal mode is equivalent to an example of a second required number. An attack of the installation object AO on the enemy boss object BO is equivalent to an example of a second attack.

As described above, no matter which of the first switching condition and the second switching condition is satisfied, if the enemy boss attack mode is switched to the normal mode, the enemy boss object BO leaves the virtual space. That is, to cause the player object PO to attack the enemy boss object BO, a user needs to wait for the normal mode to be switched to the enemy boss attack mode where the enemy boss object BO can be attacked. To attack the enemy boss object BO that appears in the enemy boss attack mode, the player object PO needs to own the ability to attack the enemy boss object BO during the enemy boss attack mode. Thus, in order for the player object PO to own the ability to attack the enemy boss object BO during the enemy boss attack mode, the worth of gaining a target object TO during the enemy boss attack mode or immediately before the enemy boss attack mode increases.

The player object PO gains a predetermined required number of target objects TO during the normal mode and/or the enemy boss attack mode, whereby the ability to attack enemy objects including the enemy boss object BO is given to the player object PO. For example, the required number of target objects TO for giving the ability to attack enemy objects to the player object PO may be greater than the above required number for ending the enemy boss attack mode (the required number of target objects TO set in the second switching condition). As an example, the required number of target objects TO for giving the ability to attack enemy objects to the player object PO may increase in a gradually increasing manner Every time the player object PO obtains the above ability, the required number may increase, such as 5, 15, and 25 . . . . A form in which the ability to attack enemy objects is given to the player object PO may be achieved by various representations. The ability to attack enemy objects may be given to the player object PO by a representation that the player object PO becomes enormous, or a weapon is given to the player object PO, or companies of the player object PO increase. The required number of target objects TO for giving the ability to attack enemy objects to the player object PO is equivalent to an example of a first required number. A game mode played in the state where the ability to attack enemy objects at least including the enemy boss object BO is given to the player object PO (an attack-on-enemy-boss-possible state) is equivalent to an example of a third mode.

As shown in FIG. 11, in a case where the ability to attack at least the enemy boss object BO is given to the player object PO during the enemy boss attack mode (the attack-on-enemy-boss-possible state), or in a case where an attack-on-enemy-possible state continues from the normal mode to during the enemy boss attack mode, the player object PO can attack the enemy boss object BO using the ability in accordance with a user operation. For example, the player object PO attacks the enemy boss object BO during the enemy boss attack mode, whereby a predetermined amount of damage is caused to the enemy boss object BO. This attack of the player object PO also reduces the life value of the enemy boss object BO by a predetermined amount, and therefore, the life value of the enemy boss object BO indicated by the gauge G also decreases by the predetermined amount. Then, if the life value of the enemy boss object BO reaches 0 during the enemy boss attack mode due to an attack of the player object PO, the enemy boss object BO is defeated by being crushed, and the enemy boss attack mode ends. An attack of the player object PO on the enemy boss object BO is equivalent to an example of a first attack.

As described above, in a case where the enemy boss object BO is defeated by an attack of the player object PO and the enemy boss attack mode ends, the range where the player object PO can move in the virtual space is enlarged. Also in a case where the enemy boss object BO is defeated by an attack of the installation object AO when the enemy boss attack mode ends, the range where the player object PO can move in the virtual space may be enlarged. In either case, the range where the player object PO can move is enlarged, whereby it is possible to increase the location where a target object TO can be gained and which the player object PO can reach. Thus, as a result, it is possible to increase the number of target objects TO that can be gained by the player object PO in the virtual space.

The timing when the range where the player object PO can move in the virtual space is enlarged, i.e., the number of target objects TO that can be gained by the player object PO is increased in the virtual space, may not be the timing when the enemy boss object BO is defeated and the enemy boss attack mode ends. For example, even in the state where the enemy boss object BO is not defeated and can still act in the virtual space, in accordance with a decrease in the life value of the enemy boss object BO to a predetermined value greater than 0 during the enemy boss attack mode, the number of target objects TO that can be gained by the player object PO may be increased.

Even if the enemy boss object BO is defeated by an attack of the player object PO or the installation object AO, the enemy boss object BO may be revived again and enabled to appear in the virtual space. For example, the timing when the normal mode is switched to the enemy boss attack mode where the enemy boss object BO is revived again and caused to appear may require the lapse of time longer than the first time (e.g., six minutes), which is the above normal cycle. As an example, due to the lapse of a third time (e.g., 10 minutes) from the end of the enemy boss attack mode when the enemy boss object BO is defeated, the normal mode may be switched to the enemy boss attack mode where the enemy boss object BO is revived again and caused to appear. In this case, after the enemy boss object BO is revived again and caused to appear, the timing when the normal mode is further switched to the next enemy boss attack mode may be switched by being returned to the normal mode every time the above first time elapses.

In a case where the enemy boss attack mode ends by defeating the enemy boss object BO, the number of target objects TO that can be gained by the player object PO in the virtual space may increase by another method. As a first example, an enemy object that drops a target object TO by being defeated by the player object PO may newly appear in the virtual space. As a second example, the location where a target object TO can be gained may be newly added within the range where the player object PO can move. As a third example, a non-player object that hands over a target object TO to the player object PO may newly appear in the virtual space. As a fourth example, a mini-game (a quest) where the player object PO can acquire a target object TO may be enabled to be executed.

Alternatively, a target object TO that can be gained by the player object PO may be set by an attack of the enemy boss object BO in the enemy boss attack mode. As an example, another object (e.g., a block object) in the virtual space may be destroyed by an attack of the enemy boss object BO on the player object PO, whereby a target object TO may appear from within the other object. Consequently, it is possible to provide a motivation to move the player object PO (e.g., to avoid an attack of the enemy boss object BO) in the enemy boss attack mode.

In the above exemplary embodiment, an example is used where if the life value of the enemy boss object BO reaches 0, the enemy boss object BO is defeated. Here, the life value of the enemy boss object BO may be reduced by a predetermined amount by an attack of the player object PO or an attack of the installation object AO. In this case, the life value of the enemy boss object BO reaching 0 means that the accumulated amount of attack on the enemy boss object BO exceeds the amount of attack for causing the life value to reach 0. That is, if the accumulated amount of attack on the enemy boss object BO exceeds a predetermined amount, the enemy boss object BO is defeated. Even if the enemy boss attack mode ends, the accumulated amount of attack on the enemy boss object BO at the time of the end may be maintained (i.e., the life value may be maintained) when the accumulated amount of attack starts in the next enemy boss attack mode, or may decrease by a predetermined amount (i.e., the life value may be restored by a predetermined amount).

Figure 12:
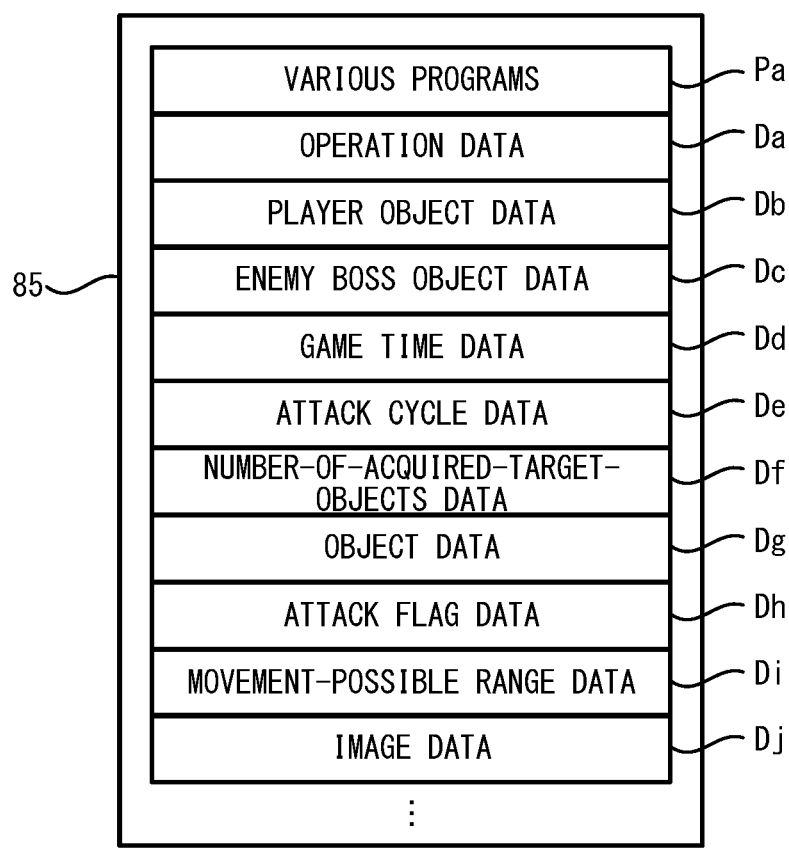
FIG. 12 is a diagram showing a non-limiting example of a data area set in a DRAM 85 of the main body apparatus 2 in the exemplary embodiment.

Next, with reference to FIGS. 12 to 15, a description is given of an example of a specific process executed by the game system 1 in the exemplary embodiment. FIG. 12 is a diagram showing an example of a data area set in the DRAM 85 of the main body apparatus 2 in the exemplary embodiment. It should be noted that in the DRAM 85, in addition to the data shown in FIG. 12, data used in another process is also stored, but is not described in detail here.

In a program storage area of the DRAM 85, various programs Pa, which are executed by the game system 1, are stored. In the exemplary embodiment, as the various programs Pa, an application program for performing information processing based on data acquired from the left controller 3 and/or the right controller 4 (e.g., a game program) and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as information processing executed by the game system 1 is stored. In the exemplary embodiment, in the DRAM 85, operation data Da, player object data Db, enemy boss object data Dc, game time data Dd, attack cycle data De, number-of-acquired-target-objects data Df, object data Dg, attack flag data Dh, movement-possible range data Di, image data Dj, and the like are stored.

The operation data Da is operation data appropriately acquired from each of the left controller 3 and/or the right controller 4 and the main body apparatus 2. As described above, operation data acquired from each of the left controller 3 and/or the right controller 4 and the main body apparatus 2 includes information regarding an input (specifically, information regarding an operation) from each of the input sections (specifically, each button, each analog stick, and the touch panel). In the exemplary embodiment, operation data is acquired in a predetermined cycle from each of the left controller 3 and/or the right controller 4 and the main body apparatus 2, and the operation data Da is appropriately updated using the acquired operation data. It should be noted that the update cycle of the operation data Da may be such that the operation data Da is updated every frame, which is the cycle of the processing described later executed by the main body apparatus 2, or is updated every cycle in which the above operation data is acquired.

The player object data Db is data indicating the placement position and the placement orientation of the player object placed in the virtual space and the action, the state, and the like of the player object in the virtual space. The enemy boss object data Dc is data indicating the placement position and the placement orientation of the enemy boss object placed in the virtual space and the action, the state, and the like of the enemy boss object in the virtual space.

The game time data Dd is data indicating the elapsed time from the start of a game. The attack cycle data De is data indicating the cycle in which the enemy boss attack mode is performed (specifically, game times when the next enemy boss attack mode is started and ended).

The number-of-acquired-target-objects data Df is data indicating the number of target objects acquired by the player object.

The object data Dg is data indicating the type, the placement position, the placement orientation, the placement state, and the like of each of objects such as a placement object placed in the virtual space.

The attack flag data Dh is data indicating an attack flag that is set to on in a case where the player object is in the state where the player object can attack enemy objects such as the enemy boss object.

The movement-possible range data Di is data indicating the range where the player object can move in the virtual space.

The image data Dj is data for displaying an image (e.g., an image of the player object, an image of the enemy boss object, an image of another enemy object, an image of another object such as a placement object, an image of the virtual space, a background image, and the like) on the display screen (e.g., the display 12 of the main body apparatus 2).

Figure 13:
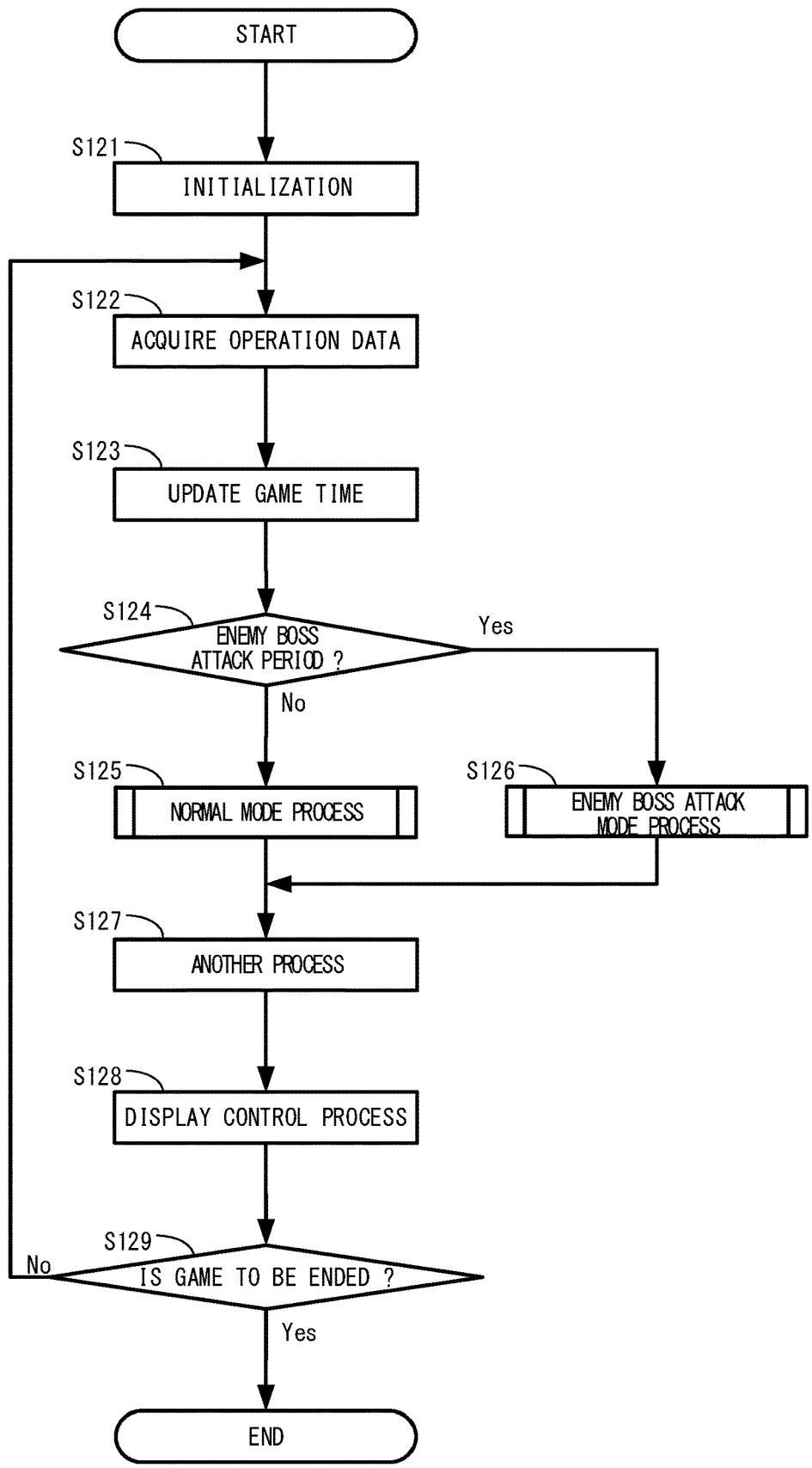
FIG. 13 is a flow chart showing a non-limiting example of information processing executed by a game system 1.
Figure 14:
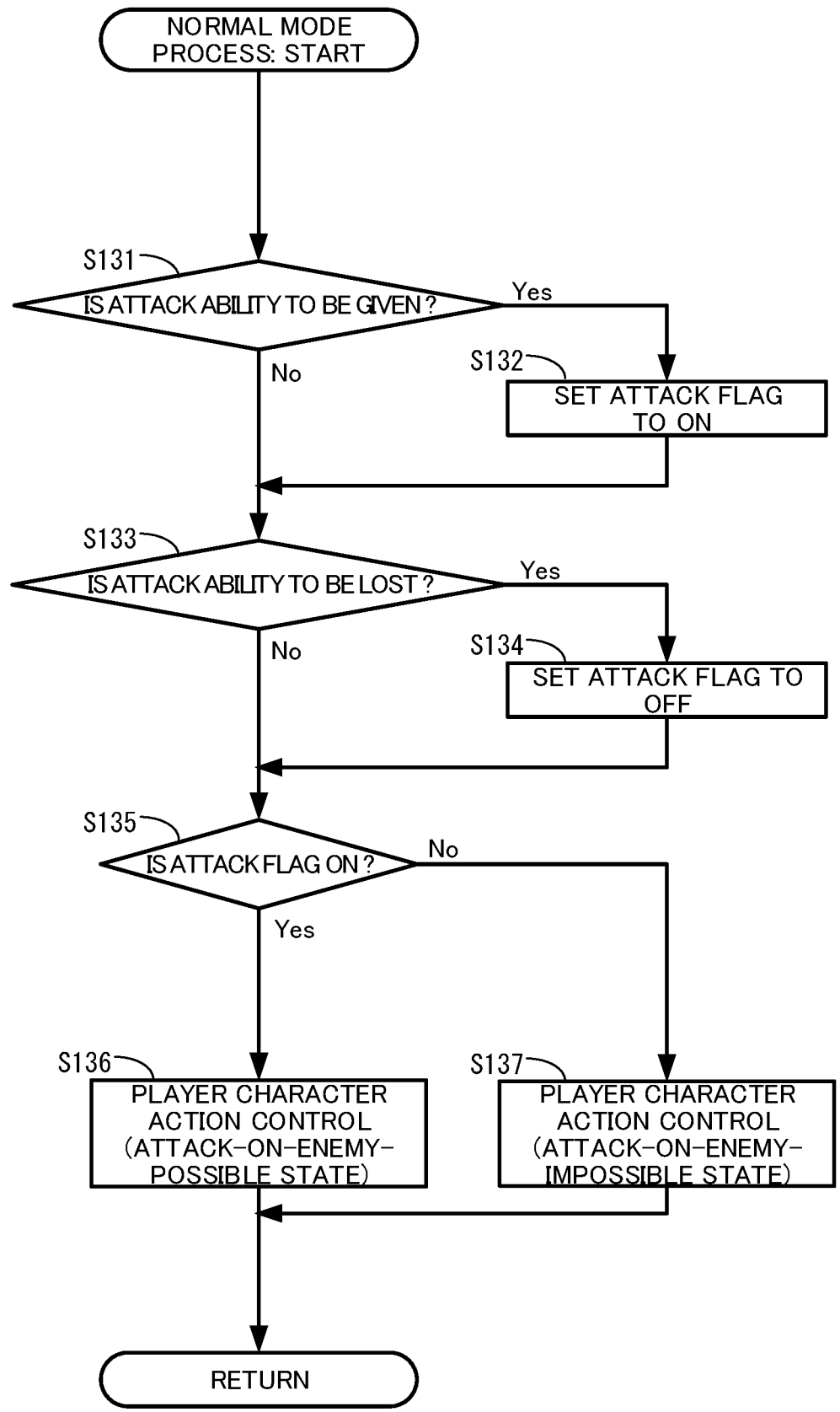
FIG. 14 is a subroutine showing a non-limiting detailed example of a normal mode process performed in step S125 in FIG. 13.
Figure 15:
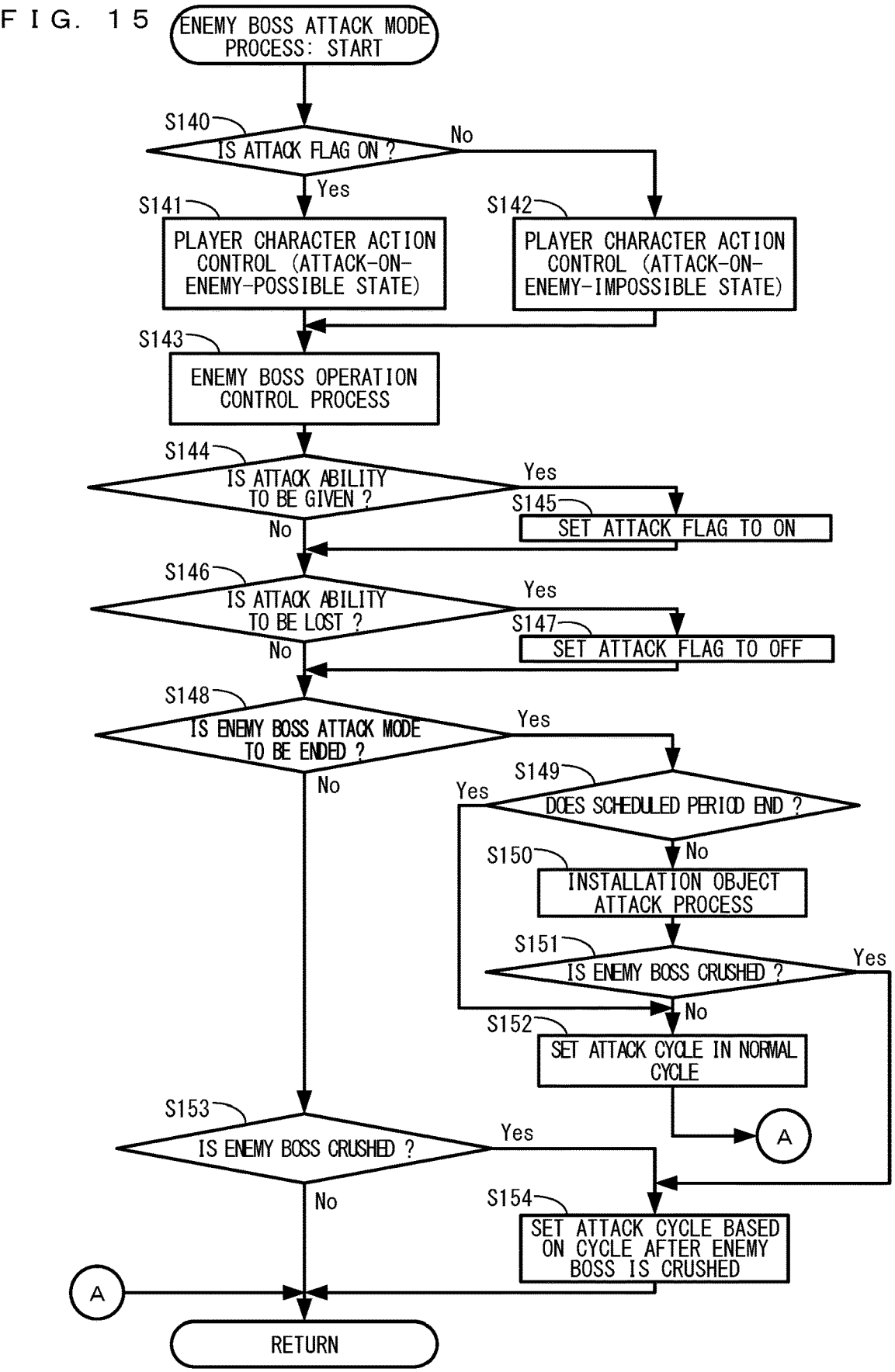
FIG. 15 is a subroutine showing a non-limiting detailed example of an enemy boss attack mode process performed in step S126 in FIG. 13.

Next, with reference to FIGS. 13 to 15, a detailed example of information processing according to the exemplary embodiment is described. FIG. 13 is a flow chart showing an example of information processing executed by the game system 1. FIG. 14 is a subroutine showing a detailed example of a normal mode process performed in step S125 in FIG. 13. FIG. 15 is a subroutine showing a detailed example of an enemy boss attack mode process performed in step S126 in FIG. 13. In the exemplary embodiment, a series of processes shown in FIGS. 13 to 15 is performed by the processor 81 executing a predetermined application program (a game program) included in the various programs Pa. Further, the information processing shown in FIGS. 13 to 15 is started at any timing.

It should be noted that the processes of all of the steps in the flow charts shown in FIGS. 13 to 15 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 13 to 15 may be executed by the cooperation of a plurality of information processing apparatuses including the main body apparatus 2.

In FIG. 13, the processor 81 performs initialization in information processing (step S121), and the processing proceeds to the next step. For example, in the initialization, the processor 81 initializes parameters for performing the processing described below. For example, based on the settings of the virtual space made in advance, the processor 81 initially places the player object and other objects in the virtual space, thereby initializing the player object data Db and the object data Dg. The processor 81 sets a non-action state where the enemy boss object is not placed in the virtual space, thereby updating the enemy boss object data Dc. The processor 81 initializes a game time to 0, thereby updating the game time data Dd. The processor 81 sets a game time when the next enemy boss attack mode is started and a game time when the enemy boss attack mode is ended to the elapsed time in the normal cycle, thereby updating the attack cycle data De. The processor 81 sets the range where the player object can move in the virtual space to a default range or the range set when the previous game is played, thereby updating the movement-possible range data Di.

Next, the processor 81 acquires operation data from the left controller 3, the right controller 4, and/or the main body apparatus 2 and updates the operation data Da (step S122), and the processing proceeds to the next step.

Next, the processor 81 updates the game time (step S123), and the processing proceeds to the next step. For example, based on the elapsed time, the processor 81 updates the game time indicated by the game time data Dd.

Next, the processor 81 determines whether or not the current moment is within the period of the enemy boss attack mode (step S124). For example, based on the game time indicated by the game time data Dd, the processor 81 makes the determination in the above step S124. Then, if the current moment is within the period of the enemy boss attack mode, the processing of the processor 81 proceeds to step S126. If, on the other hand, the current moment is not within the period of the enemy boss attack mode, the processing of the processor 81 proceeds to step S125.

In step S125, the processor 81 performs game processing in the normal mode, and the processing proceeds to step S127. With reference to FIG. 14, a description is given below of the game processing in the normal mode performed in the above step S125.

In FIG. 14, the processor 81 determines whether or not the attack ability is to be given to the player object PO (step S131). For example, if the number of acquired target objects TO indicated by the number-of-acquired-target-objects data Df reaches the required number of target objects TO for giving the ability to attack enemy objects to the player object PO at the current moment, the determination of the processor 81 is affirmative in the above step S131. Then, if the attack ability is to be given to the player object PO, the processing of the processor 81 proceeds to step S132. If, on the other hand, the attack ability is not to be given to the player object PO, or the attack ability is already given, the processing of the processor 81 proceeds to step S133.

In step S132, the processor 81 sets the attack flag to on, and the processing proceeds to step S133. For example, the processor 81 sets the attack flag indicated by the attack flag data Dh to on, thereby updating the attack flag data Dh. The processor 81 changes the state of the player object PO to a form indicating that the ability to attack enemy objects is given, thereby updating the player object data Db.

In step S133, the processor 81 determines whether or not the attack ability of the player object PO is to be lost. For example, if a predetermined time elapses since the attack ability is given to the player object PO, or if it is immediately after the player object PO defeats the enemy boss object BO, the determination of the processor 81 is affirmative in the above step S133. Then, if the attack ability of the player object PO is to be lost, the processing of the processor 81 proceeds to step S134. If, on the other hand, the attack ability of the player object PO is not to be lost, or the player object PO already does not have the attack ability, the processing of the processor 81 proceeds to step S135.

In step S134, the processor 81 sets the attack flag to off, and the processing proceeds to step S135. For example, the processor 81 sets the attack flag indicated by the attack flag data Dh to off, thereby updating the attack flag data Dh. The processor 81 changes the state of the player object PO to a form indicating that the ability to attack enemy objects is lost, thereby updating the player object data Db.

In step S135, with reference to the attack flag data Dh, the processor 81 determines whether or not the attack flag is on. Then, if the attack flag is on, the processing of the processor 81 proceeds to step S136. If, on the other hand, the attack flag is off, the processing of the processor 81 proceeds to step S137.

In step S136, in accordance with the operation data Da, the processor 81 performs action control of the player object PO in the state where the player object PO can attack enemies. Then, the processing of this subroutine ends. For example, based on the operation data Da acquired in step S122, the processor 81 causes the player object PO to perform an action such as an attack or a movement, thereby updating the player object data Db. In accordance with the action of the player object PO and the state of the surroundings, and based on virtual physical calculations on the player object PO and the virtual space, the processor 81 causes the player object PO placed in the virtual space to perform an action, thereby updating the player object data Db. Further, based on a state change calculation for changing the state of the player object PO, and in accordance with an attack and the like of an enemy object, the processor 81 changes the state of the player object PO, thereby updating the player object data Db. If the player object PO acquires target objects TO, the processor 81 adds the number of these acquired target objects TO to the number of acquired target objects TO, thereby updating the number-of-acquired-target-objects data Df.

On the other hand, in step S137, in accordance with the operation data Da, the processor 81 performs action control of the player object PO in the state where the player object PO cannot attack enemies. Then, the processing of this subroutine ends. For example, based on the operation data Da acquired in step S122, the processor 81 causes the player object PO to perform an action except for an attack, such as a movement, thereby updating the player object data Db. In accordance with the action of the player object PO and the state of the surroundings, and based on virtual physical calculations on the player object PO and the virtual space, the processor 81 causes the player object PO placed in the virtual space to perform an action, thereby updating the player object data Db. Further, based on a state change calculation for changing the state of the player object PO, and in accordance with an attack and the like of an enemy object, the processor 81 changes the state of the player object PO, thereby updating the player object data Db. If the player object PO acquires target objects TO, the processor 81 adds the number of these acquired target objects TO to the number of acquired target objects TO, thereby updating the number-of-acquired-target-objects data Df.

Referring back to FIG. 13, if it is determined that the current moment is within the period of the enemy boss attack mode, the processor 81 performs game processing in the enemy boss attack mode (step S126), and the processing proceeds to step S127. With reference to FIG. 15, a description is given below of the game processing in the enemy boss attack mode performed in the above step S126.

In FIG. 15, with reference to the attack flag data Dh, the processor 81 determines whether or not the attack flag is on (step S140). Then, if the attack flag is on, the processing of the processor 81 proceeds to step S141. If, on the other hand, the attack flag is off, the processing of the processor 81 proceeds to step S142.

In step S141, in accordance with the operation data Da, the processor 81 performs action control of the player object PO in the state where the player object PO can attack enemies. Then, the processing proceeds to step S143. For example, based on the operation data Da acquired in step S122, the processor 81 causes the player object PO to perform an action such as an attack or a movement, thereby updating the player object data Db. In accordance with the action of the player object PO and the state of the surroundings, and based on virtual physical calculations on the player object PO and the virtual space, the processor 81 causes the player object PO placed in the virtual space to perform an action, thereby updating the player object data Db. Further, based on a state change calculation for changing the state of the player object PO, and in accordance with an attack and the like of the enemy boss object BO or another enemy object, the processor 81 changes the state of the player object PO, thereby updating the player object data Db. If the player object PO acquires target objects TO, the processor 81 adds the number of these acquired target objects TO to the number of acquired target objects TO, thereby updating the number-of-acquired-target-objects data Df.

On the other hand, in step S142, in accordance with the operation data Da, the processor 81 performs action control of the player object PO in the state where the player object PO cannot attack enemies. Then, the processing proceeds to step S143. For example, based on the operation data Da acquired in step S122, the processor 81 causes the player object PO to perform an action except for an attack, such as a movement, thereby updating the player object data Db. In accordance with the action of the player object PO and the state of the surroundings, and based on virtual physical calculations on the player object PO and the virtual space, the processor 81 causes the player object PO placed in the virtual space to perform an action, thereby updating the player object data Db. Further, based on a state change calculation for changing the state of the player object PO, and in accordance with an attack and the like of the enemy boss object BO or another enemy object, the processor 81 changes the state of the player object PO, thereby updating the player object data Db. If the player object PO acquires target objects TO, the processor 81 adds the acquired number of these acquired target objects TO to the number of acquired target objects TO, thereby updating the number-of-acquired-target-objects data Df.

In step S143, the processor 81 performs action control of the enemy boss object BO, and the processing proceeds to the next step. For example, based on the action of the player object PO, a predetermined action algorithm, and virtual physical calculations on the virtual space, the processor 81 causes the enemy boss object BO placed in the virtual space to perform an action, thereby updating the enemy boss object data Dc. Based on a state change calculation for changing the state and the life value of the enemy boss object BO, and in accordance with an attack and the like of the player object PO, the processor 81 changes the state and the life value of the enemy boss object BO, thereby updating the enemy boss object data Dc.

In the above step S143, an attack object that damages the player object PO if the player object PO comes into contact with the attack object may be added to the virtual space, whereby the enemy boss object BO may attack the player object PO. In this case, the processor 81 adds data relating to the attack object to be added to the inside of the virtual space to the object data Dg and also moves the attack object in the virtual space based on a predetermined action algorithm and virtual physical calculations on the virtual space, thereby updating the object data Dg.

Next, the processor 81 determines whether or not the attack ability is to be given to the player object PO (step S144). For example, if the number of acquired target objects TO indicated by the number-of-acquired-target-objects data Df reaches the required number of target objects TO for giving the ability to attack enemy objects to the player object PO at the current moment, the determination of the processor 81 is affirmative in the above step S144. Then, if the attack ability is to be given to the player object PO, the processing of the processor 81 proceeds to step S145. If, on the other hand, the attack ability is not to be given to the player object PO, or the attack ability is already given, the processing of the processor 81 proceeds to step S146.

In step S145, the processor 81 sets the attack flag to on, and the processing proceeds to step S146. For example, the processor 81 sets the attack flag indicated by the attack flag data Dh to on, thereby updating the attack flag data Dh. The processor 81 changes the state of the player object PO to a form indicating that the ability to attack enemy objects is given, thereby updating the player object data Db.

In step S146, the processor 81 determines whether or not the attack ability of the player object PO is to be lost. For example, if a predetermined time elapses since the attack ability is given to the player object PO, the determination of the processor 81 is affirmative in the above step S146. Then, if the attack ability of the player object PO is to be lost, the processing of the processor 81 proceeds to step S147. If, on the other hand, the attack ability of the player object PO is not to be lost, or the player object PO already does not have the attack ability, the processing of the processor 81 proceeds to step S148.

In step S147, the processor 81 sets the attack flag to off, and the processing proceeds to step S148. For example, the processor 81 sets the attack flag indicated by the attack flag data Dh to off, thereby updating the attack flag data Dh. The processor 81 changes the state of the player object PO to a form indicating that the ability to attack enemy objects is lost, thereby updating the player object data Db.

In step S148, the processor 81 determines whether or not the enemy boss attack mode is to be ended. Then, if the enemy boss attack mode is to be ended, the processing of the processor 81 proceeds to step S149. If, on the other hand, the enemy boss attack mode is not to be ended, the processing of the processor 81 proceeds to step S153. For example, if the game time indicated by the game time data Dd reaches the game time when the enemy boss attack mode is ended that is indicated by the attack cycle data De, or if the required number for ending the enemy boss attack mode is satisfied by the player object PO acquiring a target object TO in the above step S142, the determination of the processor 81 is affirmative in the above step S148. In a case where the attack flag is set to on, and even if the required number for ending the enemy boss attack mode is satisfied by the player object PO acquiring a target object TO in the above step S141 or step S142, the determination of the processor 81 may be negative in the above step S148. In this case, if the player object PO is in the attack-on-enemy-possible state, the enemy boss attack mode continues to the scheduled game time when the enemy boss attack mode is ended, and a representation that the player object PO attacks the enemy boss object BO can be performed in priority to a representation that the enemy boss attack mode is ended.

In step S149, the processor 81 determines whether or not the enemy boss attack mode ends by the scheduled period of the enemy boss attack mode ending. Then, if the enemy boss attack mode ends by satisfying the required number of target objects TO, the processing of the processor 81 proceeds to step S150. If, on the other hand, the enemy boss attack mode ends by the scheduled period of the enemy boss attack mode ending, the processing of the processor 81 proceeds to step S152.

In step S150, the processor 81 performs an attack process for the installation object AO, and the processing proceeds to the next step. For example, the processor 81 performs control for performing a representation for causing the installation object AO placed in the virtual space to attack the enemy boss object BO. Then, based on the action and the state resulting from the attack, the processor 81 updates the enemy boss object data Dc and the object data Dg. As an example, based on a state change calculation for changing the state and the life value of the enemy boss object BO, the processor 81 changes the state and the life value of the enemy boss object BO based on the above attack, thereby updating the enemy boss object data Dc.

Next, the processor 81 determines whether or not the enemy boss object BO is crushed by the attack of the installation object AO in the above step S150 (step S151). For example, with reference to the enemy boss object data Dc, if the life value of the enemy boss object BO reaches 0 due to the attack of the installation object AO in the above step S150, the determination of the processor 81 is affirmative in the above step S151. Then, if the enemy boss object BO is not crushed, the processing of the processor 81 proceeds to step S152. If, on the other hand, the enemy boss object BO is crushed, the processing of the processor 81 proceeds to step S154.

In step S152, the processor 81 sets the next enemy boss attack mode in an attack cycle in the normal cycle, thereby ending the enemy boss attack mode at the current moment. Then, the processing of this subroutine ends. For example, the processor 81 sets the game time when the next enemy boss attack mode is started and the game time when the enemy boss attack mode is ended to the elapsed time in the normal cycle, thereby updating the attack cycle data De. When ending the enemy boss attack mode and setting the next enemy boss attack mode, the processor 81 stops the activity of the enemy boss object BO in the virtual space and causes the enemy boss object BO to leave once, thereby updating the enemy boss object data Dc. When ending the enemy boss attack mode and setting the next enemy boss attack mode, the processor 81 may set the attack flag indicated by the attack flag data Dh to off, thereby updating the attack flag data Dh. Consequently, by ending the enemy boss attack mode, the processor 81 changes the state of the player object PO to a form indicating that the ability to attack enemy objects is lost, thereby updating the player object data Db.

If, on the other hand, it is determined in step S148 that the enemy boss attack mode is not to be ended, the processor 81 determines whether or not the enemy boss object BO is crushed (step S153). Then, if the enemy boss object BO is crushed, the processing of the processor 81 proceeds to step S154. If, on the other hand, the enemy boss object BO is not crushed, the processing of the processor 81 in this subroutine ends.

In step S154, the processor 81 sets the next enemy boss attack mode in an attack cycle based on the cycle after the enemy boss is crushed, thereby ending the enemy boss attack mode at the current moment. Then, the processing of this subroutine ends. For example, the processor 81 sets the game time when the next enemy boss attack mode is started to the elapsed time based on the cycle after the enemy boss is crushed that is longer than the above normal cycle, thereby updating the attack cycle data De. Based on the above start time, the processor 81 sets the game time when the next enemy boss attack mode is ended, thereby updating the attack cycle data De. Also in a case where the enemy boss attack mode is ended by crushing the enemy boss object BO, and the next enemy boss attack mode is set, the processor 81 may set the attack flag indicated by the attack flag data Dh to off, thereby updating the attack flag data Dh. Consequently, also in a case where the enemy boss attack mode is ended by crushing the enemy boss object BO, the processor 81 changes the state of the player object PO to a form indicating that the ability to attack enemy objects is lost, thereby updating the player object data Db.

In the above step S154, by crushing the enemy boss object BO, the processor 81 may enlarge the range where the player object can move in the virtual space. In this case, in the above step S154, the processor 81 newly sets the range where the player object can move in the virtual space, by enlarging the range by a predetermined range, thereby updating the movement-possible range data Di.

Referring back to FIG. 13, in step S127, the processor 81 performs another process, and the processing proceeds to the next step. For example, as another process, the processor 81 performs action control of another object other than the player object PO and the enemy boss object BO. As an example, based on the action of the player object PO, a predetermined action algorithm, and virtual physical calculations on the virtual space, the processor 81 causes each object such as an enemy object placed in the virtual space to perform an action, thereby updating the object data Dg. Based on a state change calculation for changing the state and the life value of the enemy object, and in accordance with an attack and the like of the player object PO, the processor 81 changes the state and the life value of the enemy object, thereby updating the object data Dg.

Next, the processor 81 performs a display control process (step S128), and the processing proceeds to the next step. For example, based on the player object data Db, the enemy boss object data Dc, and the object data Dg, the processor 81 places objects such as the player object PO, the enemy boss object BO, the installation object AO, and the target object TO in the virtual space. The processor 81 sets the position and/or the orientation of the virtual camera for generating a display image and places the virtual camera in the virtual space. Then, the processor 81 generates an image of the virtual space viewed from the set virtual camera and performs control for displaying the virtual space image on the display 12.

Next, the processor 81 determines whether or not the game processing is to be ended (step S129). Examples of a condition for ending the game processing in the above step S129 include the fact that the condition for ending the game processing is satisfied, the fact that the user performs the operation for ending the game processing, and the like. If the game processing is not to be ended, the processing returns to the above step S122, and the process of step S122 is repeated. If the game processing is to be ended, the processing of the flow chart ends. Hereinafter, the series of processes of steps S122 to S129 is repeatedly executed until it is determined in step S129 that the processing is to be ended.

As described above, in the exemplary embodiment, an enemy boss attack mode where the player object PO is subjected to an attack of the enemy boss object BO can be ended not only due to the lapse of time from the start of the enemy boss attack mode but also by the player object PO acquiring a target object TO during the enemy boss attack mode. Thus, it is possible to bring diversity to behaviors that the player object PO can take on during the enemy boss attack mode. The enemy boss attack mode can be ended by acquiring a target object TO during the enemy boss attack mode without waiting for the above lapse of time. Thus, it is possible to give a user a motivation to acquire a target object TO.

Further, the game system 1 may be any apparatus, and may be a mobile game apparatus, any mobile electronic device (a PDA (Personal Digital Assistant), a mobile phone, a personal computer, a camera, a tablet, or the like. In this case, an input device for performing the operation of causing the player object PO to perform an action may not be the left controller 3, the right controller 4, or the touch panel 13 and may be another controller, a mouse, a touch pad, a touch panel, a trackball, a keyboard, a directional pad, a slide pad, or the like.

Further, the above descriptions have been given using an example where the game system 1 performs information processing and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as a game program, a game apparatus, a game system, a game processing method, and the like that are capable of bringing diversity to behaviors that a player object operated by a user can take on.

What is claimed is:

1. A non-transitory computer-readable storage medium having stored therein instructions that, when executed by a processor of an information processing apparatus, cause the information processing apparatus to perform operations comprising:

executing a video game that includes a game mode in which a player object attacks or fights a first enemy object in a virtual space, the game mode being switchable between at least a first mode, a second mode, and a third mode;

in accordance with a lapse of a first time period, switching the game mode of the video game from the first mode where a first enemy object does not attack a player object in the virtual space to the second mode where the first enemy object attacks the player object in the virtual space;

while the game mode of the video game is in one of the first mode and the second mode and based on the player object obtaining a first required number of target objects, switching the game mode to the third mode where the first enemy object is attackable using a first attack from the player object;

while the game mode is in the second mode, determining that at least one switching condition is satisfied, the at least one switching condition including a first switching condition in which a second time period has elapsed, and a second switching condition in which the player object gains a second required number of the target objects that is smaller than the first required number prior to elapsing of the second time period; and based on the determining that the at least one switching condition has been satisfied, switching the game mode of the video game from the second mode to the first mode.

2. The non-transitory computer-readable storage medium according to claim 1, wherein if an accumulated amount of attack on the first enemy object exceeds a predetermined amount, a number of the target objects that can be gained by the player object in the virtual space is increased.

3. The non-transitory computer-readable storage medium according to claim 2, wherein the number of the target objects that can be gained by the player object in the virtual space is increased by expanding a range where the player object can move in the virtual space.

4. The non-transitory computer-readable storage medium according to claim 1, wherein the operations further comprise:

based on determination that an accumulated amount of attack on the first enemy object exceeds a predetermined amount in the second mode and/or the third mode, switching the game mode to the first mode, and based on the game mode being switched to the first mode as a result of the accumulated amount exceeding the predetermined amount, switching the game mode from the first mode to the second mode based on a lapse of a third time, which is longer than the first time.

5. The non-transitory computer-readable storage medium according to claim 1, wherein the game mode is switched from the first mode to the second mode without changing a position of the player object in the virtual space.

6. The non-transitory computer-readable storage medium according to claim 1, wherein if the game mode is switched from the second mode to the first mode by satisfying the second switching condition, an accumulated amount of attack on the first enemy object is increased by performing a second attack on the first enemy object, and if the game mode is switched from the second mode to the first mode by satisfying the first switching condition, the accumulated amount of attack is not increased.

7. The non-transitory computer-readable storage medium according to claim 6, wherein the accumulated amount of attack accumulated for the first enemy object by the second attack is smaller than the accumulated amount of attack accumulated for the first enemy object by the first attack.

8. The non-transitory computer-readable storage medium according to claim 1, wherein in the first mode, the player object is not enabled to attack the first enemy object.

9. The non-transitory computer-readable storage medium according to claim 1, wherein without changing control of a behavior of a second enemy object in both the first mode and the second mode, an action of the second enemy object attacking the player object is controlled.

10. The non-transitory computer-readable storage medium according to claim 1, wherein an accumulated amount of attack on the first enemy object is not changed by switching the game mode.

11. The non-transitory computer-readable storage medium according to claim 1, wherein in the second mode and/or the third mode, an attack object that damages the player object if the player object comes into contact with the attack object is added to a field in the virtual space, thereby causing the first enemy object to attack the player object.

12. The non-transitory computer-readable storage medium according to claim 1, wherein the first time is longer than the second time.

13. A game apparatus, comprising:

a processor and a memory coupled thereto, the processor being configured to control the information processing system to at least:

execute a video game that includes a game mode in which a player object attacks or fights a first enemy object in a virtual space, the game mode being switchable between at least a first mode, a second mode, and a third mode;

in accordance with a lapse of a first time period, switch the game mode of the video game from the first mode where a first enemy object does not attack a player object in the virtual space to the second mode where the first enemy object attacks the player object in the virtual space;

while the game mode of the video game is in one of the first mode and the second mode, and based on the player object obtaining a first required number of target objects, switch the game mode to the third mode where the first enemy object is attackable using a first attack from the player object;

while the game mode is in the second mode, determine that at least one switching condition is satisfied, the at least one switching condition including a first switching condition in which a second time period has elapsed, and a second switching condition in which the player object gains a second required number of the target objects that is smaller than the first required number prior to elapsing of the second time period; and based on the determining that the at least one switching condition has been satisfied, switch the game mode of the video game from the second mode to the first mode.

14. A game system, comprising:

a processor and a memory coupled thereto, the processor being configured to control the information processing system to at least:

execute a video game that includes a game mode in which a player object attacks or fights a first enemy object in a virtual space, the game mode being switchable between at least a first mode, a second mode, and a third mode;

in accordance with a lapse of a first time period, switch the game mode of the video game from the first mode where a first enemy object does not attack a player object in the virtual space to the second mode where the first enemy object attacks the player object in the virtual space;

while the game mode of the video game is in one of the first mode and the second mode and based on the player object obtaining a first required number of target objects, switch the game mode to the third mode where the first enemy object is attackable using a first attack from the player object;

while the game mode is in the second mode, determine that at least one switching condition is satisfied, the at least one switching condition including a first switching condition in which a second time period has elapsed, and a second switching condition in which the player object gains a second required number of the target objects that is smaller than the first required number prior to elapsing of the second time period; and based on determination that the at least one switching condition has been satisfied, switch the game mode of the video game from the second mode to the first mode.

15. A game processing method, comprising:

executing a video game that includes a game mode in which a player object attacks or fights a first enemy object in a virtual space, the game mode being switchable between at least a first mode, a second mode, and a third mode;

in accordance with a lapse of a first time period, switching the game mode of the video game from the first mode where a first enemy object does not attack a player object in the virtual space to the second mode where the first enemy object attacks the player object in the virtual space;

while the game mode of the video game is in one of the first mode and the second mode and based on the player object obtaining a first required number of target objects, switching the game mode to the third mode where the first enemy object is attackable using a first attack from the player object;

while the game mode is in the second mode, determining that at least one switching condition is satisfied, the at least one switching condition including a first switching condition in which a second time period has elapsed, and a second switching condition in which the player object gains a second required number of the target objects that is smaller than the first required number prior to elapsing of the second time period; and based on the determining that the at least one switching condition has been satisfied, switching the game mode of the video game from the second mode to the first mode.

* * * * *